United States Patent Office 3,117,123
Patented Jan. 7, 1964

3,117,123
S-(10-PHENOXARSINYL)PHENOTHIAZONIUM
CHLORIDE
Stanley J. Strycker, Midland, Mich., assignor to The Dow Chemical Company, Midland, Mich., a corporation of Delaware
No Drawing. Filed May 31, 1962, Ser. No. 198,708
1 Claim. (Cl. 260—242)

The present invention is directed to S-(10-phenoxarsinyl)phenothiazonium chloride corresponding to the formula:

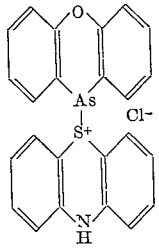

This novel compound is a crystalline solid material which is somewhat soluble in many common organic solvents and of low solubility in water. The compound is useful as a herbicide and parasiticide for the control of many mite, insect and bacterial and fungal pests such as flies, snails, trash fish, tomato early blight, round worms and Cabomba.

The new compound can be prepared by reacting together 10-chlorophenoxarsine and phenothiazine. The reaction conveniently is carried out in a liquid reaction medium such as an organic solvent. The amounts of the reagents to be employed are not critical, some of the desired product being obtained when employing any proportions thereof. In a preferred method of operation, substantially equimolecular proportions of the 10-chlorophenoxarsine and phenothiazine materials are employed. The reaction takes place readily at the temperature range of from 20° to 120° C. with the production of the desired product. In carrying out the reaction, the 10-chlorophenoxarsine and phenothiazine are contacted together in a convenient fashion and the resulting mixture maintained in the reaction temperature range for a period of time to insure the completion of the reaction and the production of the desired product. Upon completion of the reaction, the desired product is separated by filtration and may be purified by conventional methods such as solvent extraction and recrystallization.

In a representative operation, 0.1 mole quantities of 10-chlorophenoxarsine and phenothiazine are mixed together with stirring in about 300 milliliters of benzene and the resulting mixture maintained with stirring at the boiling temperature (about 80° C.) for 3 hours and under reflux. The reaction mixture is then cooled to room temperature and filtered to separate the S-(10-phenoxarsinyl)phenothiazonium chloride product as a crystalline residue. This product is recrystallized from cyclohexane and found to melt at 155.5°–156° C.

The new S-(10-phenoxarsinyl)phenothiazonium chloride of the present invention is effective as a herbicide and parasiticide. For such use, the product can be dispersed on inert finely divided solid and employed as a dust. Such mixture may be dispersed in water with or without the aid of a surface active dispersing agent and the resulting aqueous suspensions employed as sprays. In other procedures, the product can be employed as an active constituent in solvent compositions, oil-in-water or water-in-oil emulsions or aqueous dispersions. In representative operations, aqueous compositions containing 100 parts per million by weight of the S-(10-phenoxarsinyl)phenothiazonium chloride compound give substantially complete kills of Cabomba, southern army worms, tomato early blight and leaf wheat rust. In additional operations, compositions containing 0.1 percent by weight of the chloride compound give substantially complete kills of ascarids and tape worms.

What is claimed is:
S-(10-phenoxarsinyl)phenothiazonium chloride.

No references cited.